United States Patent Office 3,180,097
Patented Apr. 27, 1965

3,180,097
PROCESS OF RENDERING GROUND
IMPERMEABLE TO WATER
Richard Henry McDowell, London, England, assignor to Alginate Industries Limited, London, England, a British company
No Drawing. Filed Aug. 7, 1961, Ser. No. 129,901
Claims priority, application Great Britain, Aug. 12, 1960, 28,012/60
6 Claims. (Cl. 61—36)

This invention relates to constructional work and more particularly to constructional work of the kind (hereinafter referred to as "the kind described") wherein difficulties are encountered due to seepage of water into the workings. Examples of such constructional work are excavating, tunnelling and dam building.

The present invention provides, in one of its aspects, in constructional work of the kind described the process of impregnating ground adjacent to the workings with a solution comprising a soluble alginate, a polyvalent metal compound which will react to form an insoluble alginate when the pH of the liquid is lower than a critical value and means are employed whereby the pH of the solution is lowered below the initial value after the liquid is in situ, so as to form an insoluble gel independently of naturally occurring precipitating substances in the ground. Examples of polyvalent metal compounds which will react to form an insoluble alginate only when the pH of the liquid is lowered from an initial value at which no insoluble alginate is formed are dicalcium phosphate, basic calcium phosphate, copper carbonate and zinc oxide.

The means employed whereby the pH of the solution is lowered may comprise including a source of hydrogen ions in the impregnating solution, which source reacts to produce such ions slowly enough to permit impregnation before the said source lowers the pH to the critical value.

In this manner insoluble alginate is formed in the ground adjacent to the workings independently of any salts naturally occurring in the ground. Furthermore the source of hydrogen ions permits control of the rate of formation of insoluble alginate to be effected.

In one form of the process there is used as a source of hydrogen ions an ammonium compound mixed with formaldehyde, or with a substance which yields formaldehyde in aqueous solution. A product of the reaction between formaldehyde and an ammonium compound is hexamethylene-tetramine which is antiseptic and will render the insoluble alginate which is formed in the pores in the ground resistant to attack by micro-organisms. An excess of formalin in the impregnating liquid enhances this result. In order to enhance the resistance of the insoluble alginate still further it is preferred to include, in the impregnating liquid, a preservative compound; such a preservative compound may be a zinc or copper compound and may be used in combination with a less expensive calcium compound.

In order to allow the impregnating liquid to be pumped as far as is necessary before insoluble alginate is formed when the ground to be impregnated is extensive, the source of hydrogen ions preferably comprises formaldehyde and an ammonium salt of a weak acid. The rate of the reaction may be further controlled by including in the impregnating liquid a metal sequestering salt, such as sodium metaphosphate glass (also known as sodium hexametaphosphate). The presence of the metal sequestering salt will also hinder an instantaneous reaction which might otherwise take place between the soluble alginate in the impregnating liquid and any calcium salts which may be present in the strata which are being impregnated.

The polyvalent metal compound may be yielded by a soluble complex compound which is broken down as the pH of the impregnating liquid is lowered. More generally the polyvalent metal compound will be insoluble and must be held in suspension in the impregnating liquid in a finely divided state while the impregnating liquid is pumped through the pores in the strata. A preferred impregnating liquid comprises a soluble alginate and a colloidal dispersion of tricalcium phosphate, the amount of calcium phosphate being not more than that equivalent to the alginate, together with a source of hydrogen ions comprising an ammonium salt and formalin in quantities sufficient to lower the pH of the impregnating liquid to about 6, at which value insoluble alginate is yielded.

The soluble alginate may be present as ammonium alginate in which case no additional ammonium salt is required for the source of hydrogen ions.

The concentration of alginate in the impregnating liquid is dependent upon the nature of the ground to be impregnated. In order that the impregnating liquid should be easily pumped through the ground, the liquid should be of low viscosity when the ground is relatively impermeable. Although the gel of insoluble alginate formed from liquids of low concentration and viscosity is weak, such a gel is only required to seal ground which is initially relatively impermeable. A suitable range of concentrations of soluble alginate is between ½% and 2% the lower concentration being employed in more impermeable ground.

It will be appreciated that insoluble alginates can be readily dissolved with alkali such as sodium carbonate should the impregnating liquid gel early. Furthermore gelling of the liquid can be readily retarded by adding aqueous ammonia and initiated by adding formalin.

In some cases, for example when an increase in the mechanical strength of the ground is wanted, it is advantageous to include in the mixture used to produce the insoluble alginate water soluble substances which will react to form an insoluble resin when the mixture is made acidic.

The following are examples of impregnating liquids and their use according to the invention:

*Example I*

A solution was made up containing:
10 lbs. low viscosity sodium alginate (Manutex SX/LD)
10 lbs. diammonium phosphate
Water to 100 gallons In this solution 4 lbs. cupric carbonate was thoroughly dispersed. Immediately the liquid was required for use, 3 gallons of formalin (approximately 40 grams formaldehyde) was well mixed in.

The mixture remained as a liquid which could easily be pumped for half an hour, and had set to a jelly, capable of rendering porous soil impermeable to water in 40 minutes.

*Example II*

A dry product containing equivalent parts of sodium alginate and colloidal tricalcium phosphate was prepared by reacting moist calcium alginate with trisodium phosphate and then drying.

1 lb. of this product
1 lb. diammonium phosphate were dissolved in 10 gallons of water
1 quart of formalin was mixed in and the mixture started to set after 10 minutes.

This rate of reaction would be too quick in most cases and the rate can be reduced by the inclusion of sodium metaphosphate glass (commonly sold as "Calgon"). Calgon is defined as the trademark for a sodium phosphate glass commonly called "sodium hexametaphosphate" as stated on page 212, bottom of second column of the Condensed Chemical Dictionary, fifth edition, 1956, published by Reinhold Publishing Corporation, New York, N.Y.

1½ ozs. of the metaphosphate included in the above amount gave a mixture which set in about an hour. Using intermediate quantities gave mixtures which set at different times between 10 minutes and one hour.

*Example III*

A dry product (referred to below as product A) was prepared by mixing batches of 400 lbs. moist calcium alginate (containing 124 lbs. dry calcium alginate) with 40 lbs. anhydrous trisodium phosphate in a heavy duty mixer until the product had a uniform pasty consistency. It was then dried and ground to pass a 60 mesh BSS sieve. The product consisted of colloidal calcium phosphate dispersed in sodium alginate.

A powder "B" was then prepared by mixing in the dry state:

100 lbs. product A
100 lbs. low viscosity sodium alginate (sold as Manutex SX/LD)
100 lbs. diammonium phosphate
10 lbs. sodium metaphosphate powder glass It will be noted that powder B contains added sodium alginate over and above what is equivalent to the calcium phosphate of powder A. This additional sodium alginate is advantageous in that it checks any tendency for the jelly to shrink after it has been formed in situ in the ground.

Liquid for injecting into the ground was made in batches by dissolving 30 lbs. of powder B in 100 gallons of water, and mixing into this solution 4 gallons of formalin (40% formaldehyde) immediately before injection took place.

This liquid was injected into ground consisting of mixed gravel, sand and clay in which the water table stood at 6 ft. below the surface, in such a way that the ground subsequently forming the walls and floor of a pit 10 ft. deep was impregnated with the liquid for a thickness of 2 ft. The liquid set to a jelly about 45 minutes after adding the formalin. The pit was excavated three days after treating the ground and there was very little seepage of water into it. Excavation of a similar pit in untreated ground could not be completed owing to the high rate at which water flowed into it.

*Example IV*

In this example, urea and formaldehyde were used.
The alginate product used was the powder B described in Example III.

A solution was prepared consisting of 30 lbs. powder B
150 lbs. urea
1 lb. sodium metaphosphate glass, all dissolved in 50 gallons water.

To this solution was added 50 gallons formalin (40% formaldehyde) immediately before injecting the liquid into the ground. The alginate jelly started to set in about an hour, and the ground containing the jelly increased in mechanical strength during the course of a week.

I claim:
1. The process of rendering ground substantially impermeable to water, which process comprises
   (a) impregnating the ground with a solution comprising
      (1) a soluble alginate,
      (2) a polyvalent metal compound which will react with the soluble alginate to form a gel of insoluble alginate when the pH of the solution is reduced, and
      (3) a means for reducing the pH of the solution whereby the gel of insoluble alginate is formed;
   (b) effecting said impregnation of the ground before gelling of the solution occurs;
   (c) allowing the solution to gel in situ in the ground.
2. A process as claimed in claim 1 wherein the means for reducing the pH of the solution comprises a source of hydrogen ions.
3. A process as claimed in claim 2 wherein the source of hydrogen ions comprises an ammonium compound mixed with formaldehyde in aqueous solution.
4. A process as claimed in claim 3 wherein the ammonium compound is an ammonium salt of a weak acid.
5. A process as claimed in claim 1 wherein a metal sequestering salt is included in the solution in order to delay formation of the gel of insoluble alginate.
6. A process as claimed in claim 5 wherein the metal sequestering salt is sodium metaphosphate glass.

References Cited by the Examiner
UNITED STATES PATENTS

| | | | |
|---|---|---|---|
| 2,158,485 | 5/39 | Preble | 260—209.6 |
| 2,158,487 | 5/39 | Preble | 260—209.6 |
| 2,233,872 | 3/41 | Proctor | 61—36 |
| 2,329,148 | 9/43 | Leeuween | 61—36 |
| 2,441,729 | 5/48 | Steiner | 260—209.6 |
| 2,653,106 | 9/53 | Bonniksen | 260—209.6 |
| 2,655,004 | 10/53 | Wertz | 61—36 |
| 2,665,211 | 1/54 | Roland | 260—209.6 |
| 2,935,853 | 5/60 | Weeks | 61—35 |

EARL J. WITMER, *Primary Examiner.*

WILLIAM I. MUSHAKE, JACOB L. NACKENOFF,
*Examiners.*